United States Patent [19]
Frigge et al.

[11] Patent Number: 6,149,970
[45] Date of Patent: Nov. 21, 2000

[54] AQUEOUS PROTECTIVE COATING AGENT

[75] Inventors: Eva Frigge, Sprockhövel; Brigitte Bode, Ennepetal; Gerhard Breidenbach, Wuppertal; Richard Gutte, Frankfurt, all of Germany

[73] Assignees: Herberts GmbH & Co. KG, Wuppertal; Clariant GmbH, Frankfurt, both of Germany

[21] Appl. No.: 09/319,015

[22] PCT Filed: Nov. 20, 1997

[86] PCT No.: PCT/EP97/06486

§ 371 Date: May 28, 1999

§ 102(e) Date: May 28, 1999

[87] PCT Pub. No.: WO98/23692

PCT Pub. Date: Jun. 4, 1999

[30] Foreign Application Priority Data

Nov. 28, 1996 [DE] Germany .......................... 196 49 263

[51] Int. Cl.⁷ ................................. B05D 1/02; B05D 1/38
[52] U.S. Cl. ...................... 427/154; 427/156; 427/407.1; 427/409; 427/421
[58] Field of Search .................................... 427/154, 156, 427/407.1, 409, 421

[56] References Cited

FOREIGN PATENT DOCUMENTS 10-121007  5/1998  Japan .
WO 90/08165  7/1990  WIPO .

OTHER PUBLICATIONS

Patent Abstracts of Japan, vol. 006, No. 219 (C–132), Nov. 2, 1982 and JP 57 121067 A (Nippon Gosei Kagaku Kogyo KK), Jul. 28, 1982.

Patent Abstracts of Japan, vol. 011, No. 268 (C–444), Aug. 29, 1987 and JP 62 070461 A (Sakata Shokai Ltd), Mar. 31, 1987.

Karsten, Erich, Lackrohstofftabellen, Curt R. Vincentz Verlag, Hanover, 1992, 9th Ed., Sec. 9.2.2, p. 301 and Sec. 13.6.1, p. 363.

*Primary Examiner*—Erma Cameron
*Attorney, Agent, or Firm*—Pillsbury Madison & Sutro LLP

[57] ABSTRACT

This invention relates to an aqueous coating medium which contains, as binder vehicles in the form of aqueous polymer dispersions, A) 50 to 90% by weight of one or more thermoplastic copolymers of at least one C2–C4 olefin and at least one vinyl ester of a C2–C11 monocarboxylic acid, wherein the olefin(s) and vinyl ester(s) are present in a ratio by weight of 10:90 to 40:60 and together make up at least 80% by weight of the copolymer, B) 10 to 50% by weight of one or more thermoplastic (meth)acrylic copolymers which are free from comonomers containing nitrile and amide groups, and at least 50% by weight of which consists of (meth)acrylic acid esters of C1–C18 alcohols, and C) 0 to 30% by weight of one or more copolymers which are different from A) and B), wherein the percentages by weight are given with respect to the resin solids in each case and add up to 100% by weight.

12 Claims, No Drawings

AQUEOUS PROTECTIVE COATING AGENT

This application is the national phase of international application PCT/EP97/06486 filed Nov. 20, 1997 which designated the U.S.

This invention relates to aqueous coating media which are suitable for protecting high-quality merchandise, particularly for protecting the lacquer surface of motor vehicles, especially new vehicles during assembly, transport and storage for example. The coating media dry to form coatings which after use can easily be removed again as a foil-like film. The present invention also relates to a method of application of the coating media according to the invention.

Aqueous coating media for the purpose of protecting high-quality merchandise are known. New motor vehicles are coated with protective lacquers of this type during storage and transport, for example. These protective lacquers can easily be removed from the object again, for example by washing them off with appropriate cleaning solutions, or they can be stripped off as a foil which is generally disposed of by incineration.

Temporary aqueous coating media in the form of foils which can be stripped off after use are known. For example, they may be aqueous coating media based on copolymers which contain comonomers such as (meth)acrylonitrile or (meth)acrylamide. After use, the coatings which are formed are stripped off as a foil and burnt, whereupon toxic gases are evolved. Other examples include aqueous coating media based on copolymers which contain comonomers comprising groups which have been converted into anionic groups by amine neutralisation. The amines volatilise when the coating layers are dried.

Aqueous protective lacquers are known from WO 90 08 165 which can be stripped off as a foil-like film after performing their protective function. Their area of application is the temporary protection of very different parts of buildings from types of soiling which are typical of building operations during building works. These aqueous protective lacquers contain a polymer dispersion as a binder vehicle, which may comprise acrylate resins, polyvinyl alcohol, ethylene/vinyl acetate copolymers and copolymers of vinyl and acrylic comonomers, which may each be present on their own or in any desired mixture.

The object of the present invention is to provide aqueous coating media, which can be removed as a foil, for the protection of high-quality merchandise, particularly for the preservation of motor vehicles. The coating media should contain as few volatile organic substances as possible, and in particular they should satisfy the requirements in the motor vehicle industry, namely they should protect the lacquer surface of new vehicles, during assembly, transport and storage, from soiling and from the formation of water stains and from etched regions due to acid rain for example.

This object is achieved by the provision of an aqueous coating medium which contains, as binder vehicles in the form of aqueous polymer dispersions, A) 50 to 90% by weight of one or more thermoplastic copolymers of at least one C2–C4 olefine and at least one vinyl ester of a C2–C11 monocarboxylic acid, wherein the olefine(s) and vinyl ester(s) are present in a ratio by weight of 10:90 to 40:60 and together make up at least 80% by weight of the copolymer, B) 10 to 50% by weight of one or more thermoplastic (meth)acrylic copolymers which are free from comonomers containing nitrite and amide groups, and at least 50% by weight of which consists of (meth)acrylic acid esters of C1–C18 alcohols, and C) 0 to 30% by weight of one or more copolymers which are different from A) and B), wherein the percentages by weight are given with respect to the resin solids in each case and add up to 100% by weight.

Component A) of the aqueous coating medium according to the invention is an aqueous polymer dispersion based on a thermoplastic copolymer of at least one C2–C4 olefine and at least one vinyl ester of a C2–C11 monocarboxylic acid, wherein the olefine(s) and vinyl ester(s) are present in a ratio by weight of 10:90 to 40:60 and together make up at least 80% by weight of the thermoplastic copolymer. Examples of C2–C4 olefines include ethene, propene, butene-1, butene-2 and isobutene; ethene is preferred. Examples of preferred vinyl esters include vinyl acetate, vinyl propionate and vinyl versatate; vinyl acetate is particularly preferred. The versatates which can be used are vinyl esters of versatic acids. Versatic acids are trade names of the Shell company for strongly branched, saturated monocarboxylic acids comprising longer alkyl side chains and tertiary carboxyl groups. These versatic acids are C-5 to C-11 alkanoic acids. Olefine(s) and vinyl esters are present in the thermoplastic copolymer of component A) in a ratio by weight of 10:90 to 40:60; the ratio by weight of olefine(s) to vinyl ester(s) is preferably between 15:85 and 30:70. The copolymer may contain 0 to 20% by weight of olefinically unsaturated monomers which are incorporated by polymerisation and which are different from C2–C4 olefines and vinyl esters of a C2–C11 monocarboxylic acid. Comonomers which contain nitrile and amide groups are preferably excluded. Water-soluble comonomers and comonomers which contain groups which can be converted into ionic groups by neutralisation, for example (meth)acrylic acid, are also preferably excluded. If the copolymer of component A) contains acidic comonomers, the latter are only present in a small amount, for example corresponding to an acid number of the copolymer of component A) of less than 10, preferably less than 5 mg KOH/g. Apart from their olefinically unsaturated double bond, the comonomers which are optionally contained in a quantitative proportion of up to 20% by weight preferably comprise no other functional groups, such as epoxide groups, hydroxyl groups and alkoxysilane groups for example. Comonomers which are avoided in particular in this respect are those which, due to their functionality or functionalities, can result, on their own or in combination with other comonomers, in the internal crosslinking of the copolymer of component A) or in crosslinking between the copolymer of component A), the (meth)acrylic copolymer of component B) and/or the copolymer of component C). In this connection and hereinafter, the term "(meth)acrylic" denotes methacrylic and acrylic. Examples of comonomers without further functional groups apart from their olefinically unsaturated double bond which are optionally contained in the copolymer of component A) include alkyl esters such as fumaric acid dialkyl esters or maleic acid dialkyl esters, comprising a C1–C6 alkyl for example, such as methyl, ethyl, propyl, butyl, isopropyl, isobutyl, tertiary butyl or hexyl; aromatic vinyl compounds such as styrene or vinyltoluene; and particularly (meth)acrylic acid esters of C1–C18 monoalcohols, such as methyl (meth)acrylate, ethyl (meth)acrylate, propyl (meth)acrylate, butyl (meth)acrylate, isopropyl (meth)acrylate, isobutyl (meth)acrylate, tertiary butyl (meth)acrylate, hexyl (meth)acrylate, cyclohexyl (meth)acrylate, 2-ethylhexyl (meth)acrylate, 3,5,5-trimethylhexyl (meth)acrylate, dodecyl (meth)acrylate, hexadecyl (meth)acrylate, octadecyl (meth)acrylate, lauryl (meth)acrylate and isobornyl (meth)acrylate. The copolymers of aqueous polymer dispersion A) are preferably synthesised exclusively from C2–C4 olefine(s) and from vinyl ester(s) of a C2–C11 monocarboxylic acid. Ethene/vinyl acetate copolymers are particularly preferred. The glass transition temperature of the thermoplastic copolymer of component A), as determined according to DIN 53 765, is preferably between 0 and 30° C., most preferably between 5 and 20° C. The aqueous polymer dispersion A) is preferably produced by emulsion polymerisation. Examples of the ethene/vinyl acetate emulsion copolymer which is particularly preferred as component A) include commercially available products (see Karsten, Lackrohstofftabellen, Curt R. Vincentz Verlag, Hanover, 1992, 9th Edition, Section 9.2.2, page 301).

Component B) of the aqueous coating medium according to the invention is an aqueous polymer dispersion based on a thermoplastic (meth)acrylic copolymer which contains no comonomers comprising nitrile and amide groups, and at least 50% by weight of which consists of (meth)acrylic acid esters of C1–C18 alcohols. Examples of (meth)acrylic acid esters of C1–C18 alcohols include methyl (meth)acrylate, ethyl (meth)acrylate, propyl (meth)acrylate, butyl (meth)acrylate, isopropyl (meth)acrylate, isobutyl (meth)acrylate, tertiary butyl (meth)acrylate, hexyl (meth)acrylate, cyclohexyl (meth)acrylate, 2-ethylhexyl (meth)acrylate, 3,5,5-trimethylhexyl (meth)acrylate, dodecyl (meth)acrylate, hexadecyl (meth)acrylate, octadecyl (meth)acrylate, lauryl (meth)acrylate and isobornyl (meth)acrylate. The thermoplastic (meth)acrylic copolymer of component B) may contain 0 to 50% by weight of olefinically unsaturated monomers which are incorporated by polymerisation and which are different from (meth)acrylic acid esters of C1–C18 alcohols, wherein comonomers comprising nitrile and amide groups are excluded. Water-soluble comonomers and comonomers containing groups which can be converted into ionic groups by neutralisation, for example (meth)acrylic acid, are also preferably excluded. If the (meth)acrylic copolymer of component B) contains acidic comonomers, the latter are only present in a small amount, for example corresponding to an acid number of the (meth)acrylic copolymer of component B) of less than 10, preferably less than 5 mg KOH/g. Apart from their olefinically unsaturated double bond, the comonomers which are optionally contained in a quantitative proportion of up to 50% by weight preferably comprise no other functional groups, such as epoxide groups, hydroxyl groups and alkoxysilane groups for example. Comonomers which are avoided in particular in this respect are those which, due to their functionality or functionalities, can result, on their own or in combination with other comonomers, in the internal crosslinking of the (meth)acrylic copolymer of component B) or in crosslinking between the (meth)acrylic copolymer of component B), the copolymer(s) of component(s) A) and/or C). Examples of comonomers without further functional groups apart from their olefinically unsaturated double bond which are optionally contained in the (meth)acrylic copolymer of component B) include alkyl esters such as fumaric acid dialkyl esters or maleic acid dialkyl esters, comprising a C1–C6 alkyl for example, such as methyl, ethyl, propyl, butyl, isopropyl, isobutyl, tertiary butyl or hexyl; aromatic vinyl compounds such as styrene or vinyltoluene; or vinyl esters of a C2–C11 monocarboxylic acid, such as vinyl acetate, vinyl propionate and versatic acid vinyl ester. The (meth)acrylic copolymers of aqueous polymer dispersion B) are preferably synthesised exclusively from (meth)acrylic acid esters of C1–C18 alcohols. The glass transition temperature of the thermoplastic (meth)acrylic copolymer of component B), as determined according to DIN 53 765, is preferably between 0 and 30° C., most preferably between 5 and 20° C. The aqueous (meth)acrylic polymer dispersion B) is preferably produced by emulsion polymerisation. Examples of the (meth)acrylic copolymer dispersion B) include commercially available products (see Karsten, Lackrohstofftabellen, Curt R. Vincentz Verlag, Hanover, 1992, 9th Edition, Section 13.6.1, page 363). Component C) of the aqueous coating medium according to the invention comprises copolymer dispersions which are different from A) and B), wherein the selection of the monomer is subject to the same restrictions as for the copolymers of component A) and the (meth)acrylic copolymers of component B), i.e. monomers comprising nitrile and amide groups are preferably excluded. Water-soluble monomers and monomers containing groups which can be converted into ionic groups by neutralisation, for example (meth)acrylic acid, are also preferably excluded. If the copolymer of component C) contains acidic monomers, the latter are only present in a small amount, for example corresponding to an acid number of the copolymer of component C) of less than 10, preferably less than 5 mg KOH/g. Furthermore, it is preferable that no monomers are contained which, apart from their olefinically unsaturated double bond, comprise another functional group, such as epoxide groups, hydroxyl groups and alkoxysilane groups for example. Monomers which are avoided in particular in this respect are those which, due to their functionality or functionalities, can result, on their own or in combination with other comonomers, in the internal crosslinking of the copolymer of component C) or in crosslinking between the copolymer of component C), the copolymer of component A) and/or the (meth)acrylic copolymer of component B).

In one preferred embodiment, the thermoplastic copolymers of component A) and/or the copolymers of component C) are free from comonomers comprising nitrile and amide groups. Aqueous coating media are then obtained which have the additional advantage that the foils obtained after use evolve no toxic gases or only a very small amount of toxic gases on incineration.

Components A), B) and C) are mixed in a resin solids ratio of 50 to 90 parts A):10 to 50 parts B):0 to 30 parts C), wherein the parts add up to 100%. Component C) is preferably omitted, and components A) and B) only are mixed in a resin solids ratio of 50 to 90 parts A):10 to 50 parts B), preferably 55 to 85 parts A):15 to 45 parts B).

An adjustment of the pH, which may possibly be desired but is generally not necessary, of the mixtures of components A), B) and optionally C), which mixtures are generally slightly acidic, can be effected by means of organic or inorganic bases, such as ammonia, alkali metal carbonates, alkali metal hydroxides, amines or amino alcohols for example. Inorganic bases are preferred in this respect.

In addition to binder vehicle components A), B) and optionally C), the coating medium according to the invention may contain other customary lacquer additives in amounts which are customary for lacquers. Examples include light stabilisers, levelling agents, protective colloids, emulsifiers, plasticisers, anti-foaming agents, biocides, parting agents and colorants, and also pigments in covering or non-covering quantitative proportions, for marking purposes for example, and in particular the coating medium may contain rheology-controlling agents or agents with a thickening effect. Examples of the latter, which may be contained in the coating media according to the invention in quantitative proportions of 0.1 to 5% by weight, preferably of 0.5 to 3% by weight, with respect to the solid resin content in the coating media according to the invention, include microdispersed hydrated silica, inorganic layer silicates, water-soluble cellulose ethers such as hydroxyethyl cellulose, methyl cellulose or carboxymethyl cellulose, as well as synthetic polymers comprising ionic groups and/or groups with an associative effect, such as polyvinyl alcohol, poly (meth)acrylic acid, polyvinylpyrrolidone, and also ethoxylated polyurethanes or polyacrylates which have been modified in order to make them hydrophobic.

Silicones are preferably avoided in the aqueous coating medium according to the invention.

The aqueous coating medium according to the invention has a relatively high solids content, e.g. 30 to 60% by weight, preferably 40 to 55% by weight, which is optionally adjusted by the addition of deionised water. It may optionally contain an organic, water-thinnable solvent, which is added as an aid to coalescence for example, the content of which is less than 5% by weight for example, preferably less than 2% by weight, with respect to the resin solids. The aqueous coating media according to the invention most preferably contain no organic solvent.

The aqueous coating media according to the invention are applied as temporary protective coatings to high-quality merchandise. Application of the coating media produced in this manner can be effected in the usual manner, by roller application or brushing for example; they are preferably applied by spraying or pouring. Drying of the coatings produced from the coating media can be effected over a wide temperature range, between 20 and 80° C. for example. The coating media according to the invention are suitable for coatings which adhere to a multiplicity of substrates, such as wood, textiles, plastics, glass, ceramics, and to metals and lacquered metals in particular. A closed, non-crosslinked, tack-free protective coating is preferably obtained. The aqueous coating medium is preferably sprayed on to give a dry coat thickness of 30 to 100 $\mu$m, most preferably between 40 and 80 $\mu$m.

One preferred embodiment is the application of the coating medium according to the invention in which it is applied by spraying or pouring, to give a dry coat thickness of 30 to 100 $\mu$m, preferably between 40 and 80 $\mu$m, to the stoved outer lacquer coat of a motor vehicle multi-layer lacquer coating, and is dried at temperatures between 20 and 80° C. to give a closed, non-crosslinked, tack-free protective coating. One particular advantage of the aqueous coating media according to the invention is that considerable dry coat thicknesses can be obtained with them, even when they are applied by depositing them once only, particularly in one spraying step only. After performing its function as a foil-like film, the coating can be stripped from the object to be protected, without special measures, and can subsequently be dumped or disposed of by incineration, without the evolution of toxic gases and without constituting a threat to the environment.

The coating layers produced from the aqueous coating media according to the invention are characterised by a protective effect which corresponds to the requirements. They reliably protect the lacquer surface of objects to be protected from etching phenomena due to environmental effects, for example due to acid rain, and are thus particularly suitable as temporary coatings for new vehicles.

EXAMPLE 1

19 parts of a 50% by weight aqueous copolymer dispersion of acrylic acid esters with a glass transition temperature of 12° C. (determined according to DIN 53 765) were mixed with 3 parts of a commercially available parting agent. Thereafter, 78 parts of a 53% by weight aqueous ethene/vinyl acetate copolymer dispersion with a glass transition temperature of 13° C. (determined according to DIN 53 765) were admixed with vigorous stirring. The aqueous coating medium produced in this manner, which had a viscosity according to DIN 53211-4 of 32 seconds, was applied by spraying, to give a dry coat thickness of 50 $\mu$m, to a test panel which had been coated with a typical automobile mass production lacquer structure (consisting of a primer, a primer surfacer, a base lacquer and an outer clear lacquer coat). Drying for 10 minutes at 80° C. (oven temperature) gave a closed, matt silk protective coating, which after cooling could be stripped as a foil-like film from the clear lacquer surface without special measures. It was shown in a test with 36% sulphuric acid at 65° C. that the clear lacquer surface which was provided with the protective coating was protected from a first, visually perceptible damaging effect for at least 30 minutes longer than was the unprotected clear lacquer surface.

EXAMPLE 2

20 parts of the coating medium from example 1 were placed in a vessel and were mixed, using a dissolver, with one part of a commercially available polyurethane associative thickener (Borchigel L 75 N, 54%). The batch was completed, in portions, with a further 80 parts of the coating medium from example 1. The viscosity according to DIN 53211-4 was 90 seconds.

What is claimed is:

1. A method for producing a temporary protective coating, comprising:
    applying an aqueous coating medium to a substrate, wherein the aqueous coating medium comprises as binder vehicle, in the form of an aqueous polymer dispersion,
    A) 50 to 90% by weight of one or more thermoplastic copolymers of at least one $C_2$–$C_4$ olefin and at least one vinyl ester of a $C_2$–$C_{11}$ monocarboxylic acid, wherein the at least one olefin and the at least one vinyl ester are present in a ratio by weight of 10:90 to 40:60 and together make up at least 80% by weight of the copolymers,
    B) 10 to 50% by weight of one or more thermoplastic (meth)acrylic copolymers which are free from comonomers containing nitrile and amide groups, and at least 50% by weight of which consists of (meth)acrylic acid esters of $C_1$–$C_{18}$ alcohols, and
    C) 0 to 30% by weight of one or more copolymers which are different from A) and B),
    wherein the percentages by weight are given with respect to resin solids in each case and add up to 100% by weight, and
    wherein a stoved outer lacquer coat of a motor vehicle lacquer coating serves as a substrate.

2. A method according to claim 1, wherein at least one said thermoplastic copolymer of component (A) contains at least one member selected from the group consisting of $C_2$–$C_4$ olefin and vinyl acetate as the vinyl ester of a $C_2$–$C_{11}$ monocarboxylic acid.

3. A method according to claim 1, wherein the ratio by weight of olefin to vinyl ester is between 15:85 and 30:70.

4. A method according to claim 1, wherein comonomers containing nitrile and amide groups are excluded from at least one of the groups consisting of the thermoplastic copolymers of component (A) and the copolymers of component (C).

5. A method according to claim 1, wherein at least one said thermoplastic copolymer of component (A) is exclusively synthesized from $C_2$–$C_4$ olefin(s) and vinyl ester(s) of a $C_2$–$C_{11}$ monocarboxylic acid.

6. A method according to claim 1, wherein at least one member selected from the group consisting of the thermoplastic copolymers of component (A) and the thermoplastic (meth)acrylic copolymers of component (B) has a glass transition temperature between 0° and 30° C.

7. A method according to claim 1, wherein the aqueous coating medium has a solids content of 30 to 60% by weight.

8. A method according to claim 1, wherein the aqueous coating medium comprises at least one member selected from the group consisting of rheology-controlling agents and thickening agents.

9. A method according to claim 1, wherein the aqueous coating medium is applied by spraying.

10. A method according to claim 1, wherein the aqueous coating medium is applied by pouring.

11. A method according to claim 1, wherein the aqueous coating medium is applied to give a dry coat thickness of 30 to 100 $\mu$m.

12. A method according to claim 1, wherein the aqueous coating medium is applied by spraying or pouring to a stoved outer lacquer coat of a motor vehicle multi-layer lacquer coating to give a dry coat thickness of 30 to 100 $\mu$m and is dried at temperatures between 20° and 80° C. to form a non-crosslinked, tack-free protective coating.

* * * * *